US011063410B2

(12) United States Patent
Kisanuki (10) Patent No.: US 11,063,410 B2
(45) Date of Patent: Jul. 13, 2021

(54) SWITCHGEAR

(71) Applicant: Mitsubishi Electric Corporation, Tokyo (JP)

(72) Inventor: Osamu Kisanuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 29 days.

(21) Appl. No.: 16/622,999

(22) PCT Filed: Jun. 23, 2017

(86) PCT No.: PCT/JP2017/023248
§ 371 (c)(1),
(2) Date: Dec. 16, 2019

(87) PCT Pub. No.: WO2018/235276
PCT Pub. Date: Dec. 27, 2018

(65) Prior Publication Data
US 2021/0151963 A1    May 20, 2021

(51) Int. Cl.
*H02B 13/075* (2006.01)
*H01H 31/00* (2006.01)
(Continued)

(52) U.S. Cl.
CPC ......... *H02B 13/075* (2013.01); *H01H 31/003* (2013.01); *H02B 13/0358* (2013.01); *H02B 13/045* (2013.01)

(58) Field of Classification Search
CPC ................... H02B 13/035–075; H01H 31/003
See application file for complete search history.

(56) References Cited

U.S. PATENT DOCUMENTS 1,706,113 A * 3/1929 French .................. H02B 11/28
361/606
2,145,720 A * 1/1939 Giegerich ............... H02B 1/00
200/16 E
(Continued)

FOREIGN PATENT DOCUMENTS

DE    2805728 A1 * 8/1979    ......... H02B 13/0352
DE    2821049 A1 * 11/1979   ........... H02B 13/075
(Continued)

OTHER PUBLICATIONS

International Search Report (PCT/ISA/210) dated Sep. 26, 2017, by the Japan Patent Office as the International Searching Authority for International Application No. PCT/JP2017/023248.
(Continued)

*Primary Examiner* — Robert J Hoffberg
(74) *Attorney, Agent, or Firm* — Buchanan Ingersoll & Rooney PC (57) ABSTRACT

A switchgear includes: a tank having a first through hole; a fixed contact in the tank; a movable contact capable of reciprocating between a position in contact with the fixed contact and a position separated from the fixed contact; and an operating rod capable of reciprocating in a direction parallel to the direction of movement of the movable contact, and penetrating through the first through hole. The switchgear further includes: a connecting plate connecting the movable contact and the operating rod; a shielding plate disposed closer to the fixed contact than the connecting plate, having a second through hole through which the operating rod penetrates and a third through hole through which the movable contact is capable of passing formed therein; a first bearing disposed in the first through hole to support the operating rod; and a second bearing disposed in the second through hole to support the operating rod.

2 Claims, 9 Drawing Sheets

(51) Int. Cl.
*H02B 13/035* (2006.01)
*H02B 13/045* (2006.01)

(56) References Cited

U.S. PATENT DOCUMENTS

| | | | | |
|---|---|---|---|---|
| 3,889,076 | A * | 6/1975 | Olsen | H02B 1/22 200/48 R |
| 7,135,652 | B2 * | 11/2006 | Kobayashi | H01H 33/666 218/155 |
| 8,748,760 | B2 * | 6/2014 | Miller | H01H 1/385 200/50.21 |
| 9,190,230 | B2 * | 11/2015 | Johnson | H01H 31/003 |
| 9,368,946 | B2 * | 6/2016 | Miller | H01H 31/026 |
| 2015/0076115 | A1 * | 3/2015 | Chen | H02B 13/075 218/44 |

FOREIGN PATENT DOCUMENTS

| | | | | |
|---|---|---|---|---|
| EP | 196240 | A2 * | 10/1986 | H02B 13/075 |
| EP | 1585157 | A1 * | 10/2005 | H01H 33/022 |
| EP | 3121831 | A1 * | 1/2017 | H01H 31/003 |
| FR | 2423897 | A1 * | 11/1979 | H02B 13/005 |
| FR | 2959616 | A1 * | 11/2011 | H02B 13/075 |
| JP | S62202008 | U | 12/1987 | |
| JP | H0831273 | A | 2/1996 | |
| JP | H0836934 | A | 2/1996 | |
| JP | 2003123598 | A | 4/2003 | |
| JP | 4869043 | A | 2/2012 | |
| KR | 200437070 | Y1 * | 11/2007 | H01H 33/42 |
| WO | WO-2012077963 | A1 * | 6/2012 | H01H 31/003 |

OTHER PUBLICATIONS

Notice of Reasons for Refusal in Japanese Application No. 2017-564521, dated Feb. 14, 2018.

* cited by examiner

SWITCHGEAR

FIELD

The present invention relates to a switchgear that includes a movable contact and a fixed contact in a tank.

BACKGROUND

A gas-insulation switchgear is provided with a grounding switch that is a switchgear for grounding a main circuit. The grounding switch includes a fixed contact and a movable contact in a tank filled with an insulating gas. The movable contact is capable of moving between a position in contact with the fired contact and a position separated from the fixed contact. The fixed contact is connected to the main circuit. The movable contact is grounded outside of the tank. When the movable contact moves and comes into contact with the fixed contact, the main circuit is grounded. Patent Literature 1 discloses a switchgear including: an operating rod that moves a movable contact; a connecting plate that connects the operating rod and the movable contact, and moves together with the operating rod and the movable contact; and a rod member that has one end fixed on a wall of the tank, and guides movement of the connecting plate.

CITATION LIST

Patent Literature

Patent Literature 1 Japanese Patent No. 4869043

SUMMARY

Technical Problem

In a grounding switch, a movable contact is brought into contact with a fixed contact in a state in which energization of the main circuit is interrupted. However, there is a possibility that an erroneous operation is performed to bring the movable contact into contact with the fixed contact during energization of the main circuit. When such an erroneous operation is performed, an electromagnetic force acts on the movable contact, and a force to deform the movable contact is applied to the movable contact. The rod member disclosed in Patent Literature 1 prevents deformation of the movable contact in a case where an electromagnetic force is applied to the movable contact. If the capacity of the gas-insulation switchgear becomes larger, the force applied to the movable contact accordingly becomes greater. The rod member disclosed in Patent Literature 1 has a cantilever structure having one end fixed on a wall of the tank. Therefore, if the capacity of the gas-insulation switchgear becomes larger, that is, if the voltage applied to the main circuit becomes higher, the electromagnetic force to act on the movable contact accordingly becomes greater, resulting in inadequate prevention of deformation of the movable contact.

The present invention has been made in view of the above circumstances, and its object is to provide a switchgear capable of preventing deformation of a movable contact more reliably when the movable contact is brought into contact with a fixed contact.

Solution to Problem

In order to solve the problems described above and achieve the object, the present invention provides a switchgear comprising: a tank having a first through hole formed therein; a fixed contact accommodated in the tank; a movable contact capable of reciprocating between a position in contact with the fixed contact and a position separated from the fixed contact; an operating rod capable of reciprocating in a direction parallel to a direction of movement of the movable contact, the operating rod penetrating through the first through hole; a connecting plate connecting the movable contact and the operating rod to be movable with the movable contact and the operating rod; a shielding plate disposed closer to the fixed contact than the connecting plate and fixed to the tank, the shielding plate having a second through hole and a third through hole formed therein, the operating rod penetrating through the second through hole, the movable contact being capable of passing through the third through hole; a first bearing provided in the first through hole to support the operating rod; and a second bearing provided in the second through hole to support the operating rod.

Advantageous Effects of Invention

By a switchgear according to the present invention, an advantageous effect is exerted to make it possible to prevent deformation of a movable contact more reliably when the movable contact is brought into contact with a fixed contact.

DESCRIPTION OF EMBODIMENTS

The following is a detailed description of a switchgear according to an embodiment of the present invention, with reference to the drawings. It should be noted that the present invention is not limited by the embodiment.

First Embodiment

Figure 1:
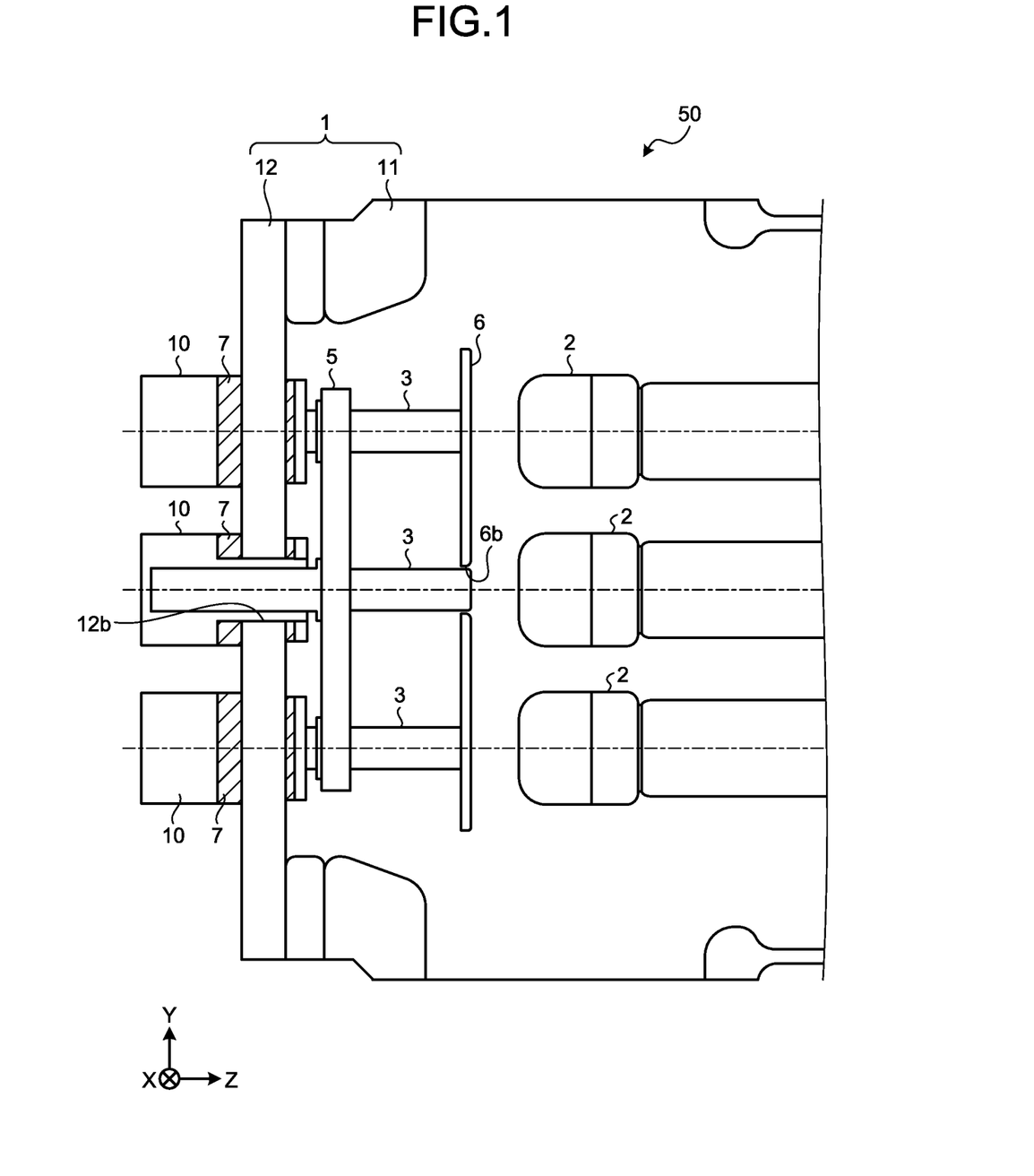
FIG. 1 is a cross-sectional view of a switchgear according to a first embodiment of the present invention taken along an X-axis, which illustrates a state in which a movable contact is separated from a fixed contact.
Figure 2:
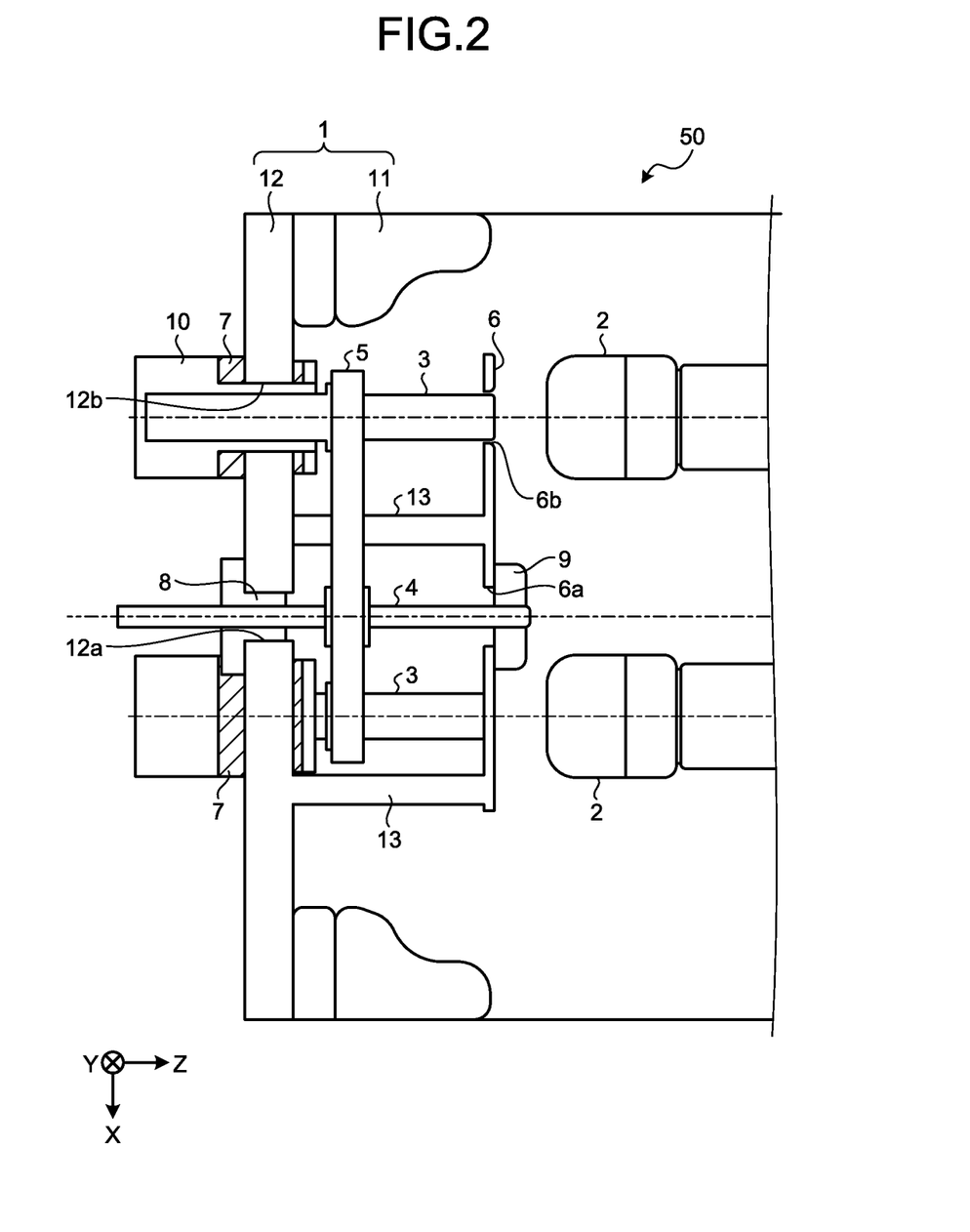
FIG. 2 is a cross-sectional view of the switchgear according to the first embodiment taken along a Y-axis, which illustrates a state in which the movable contact is separated from the fixed contact.
Figure 3:
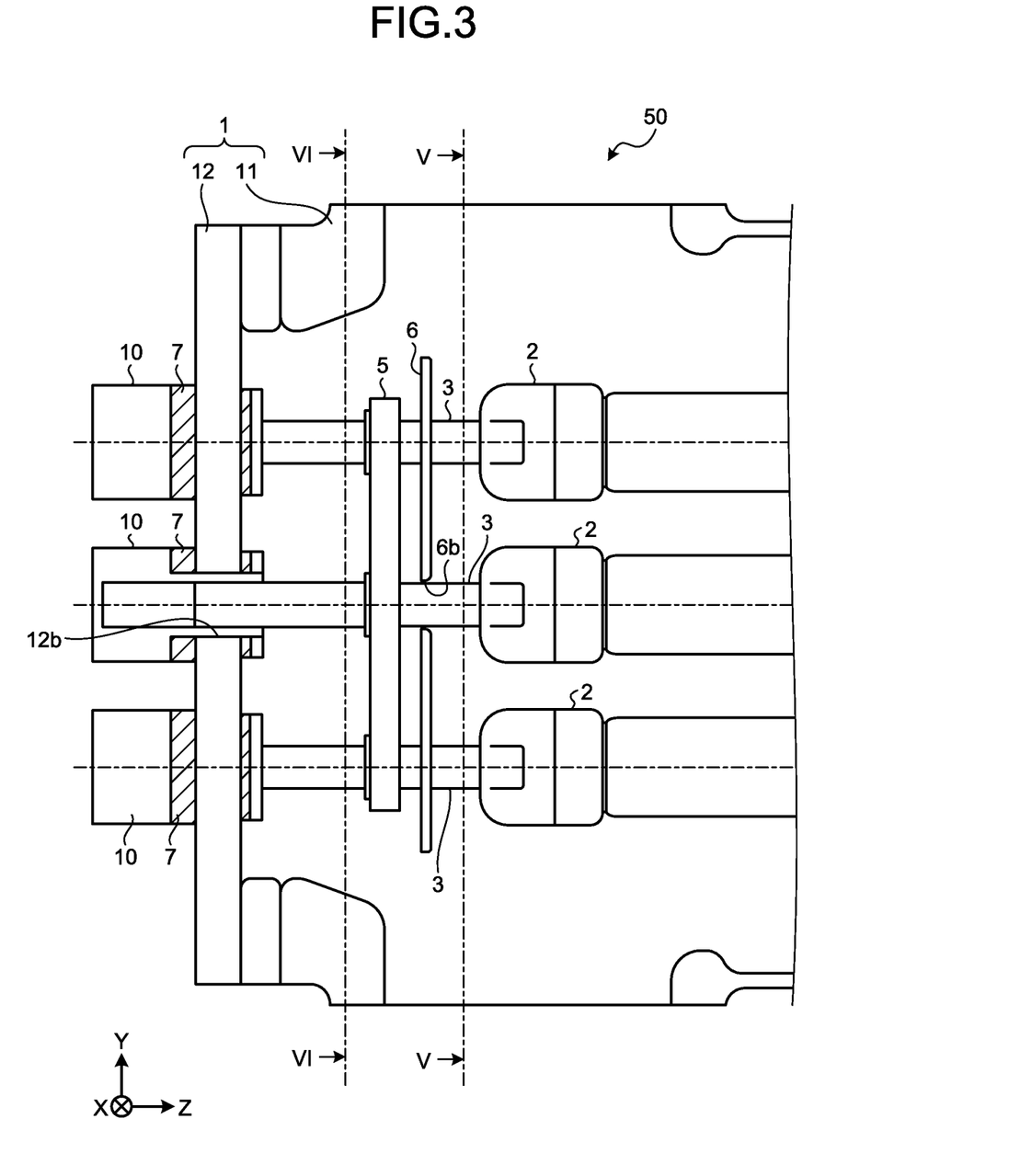
FIG. 3 is a cross-sectional view of the switchgear according to the first embodiment taken along an X-axis, which illustrates a state in which the movable contact is in contact with the fixed contact.
Figure 4:
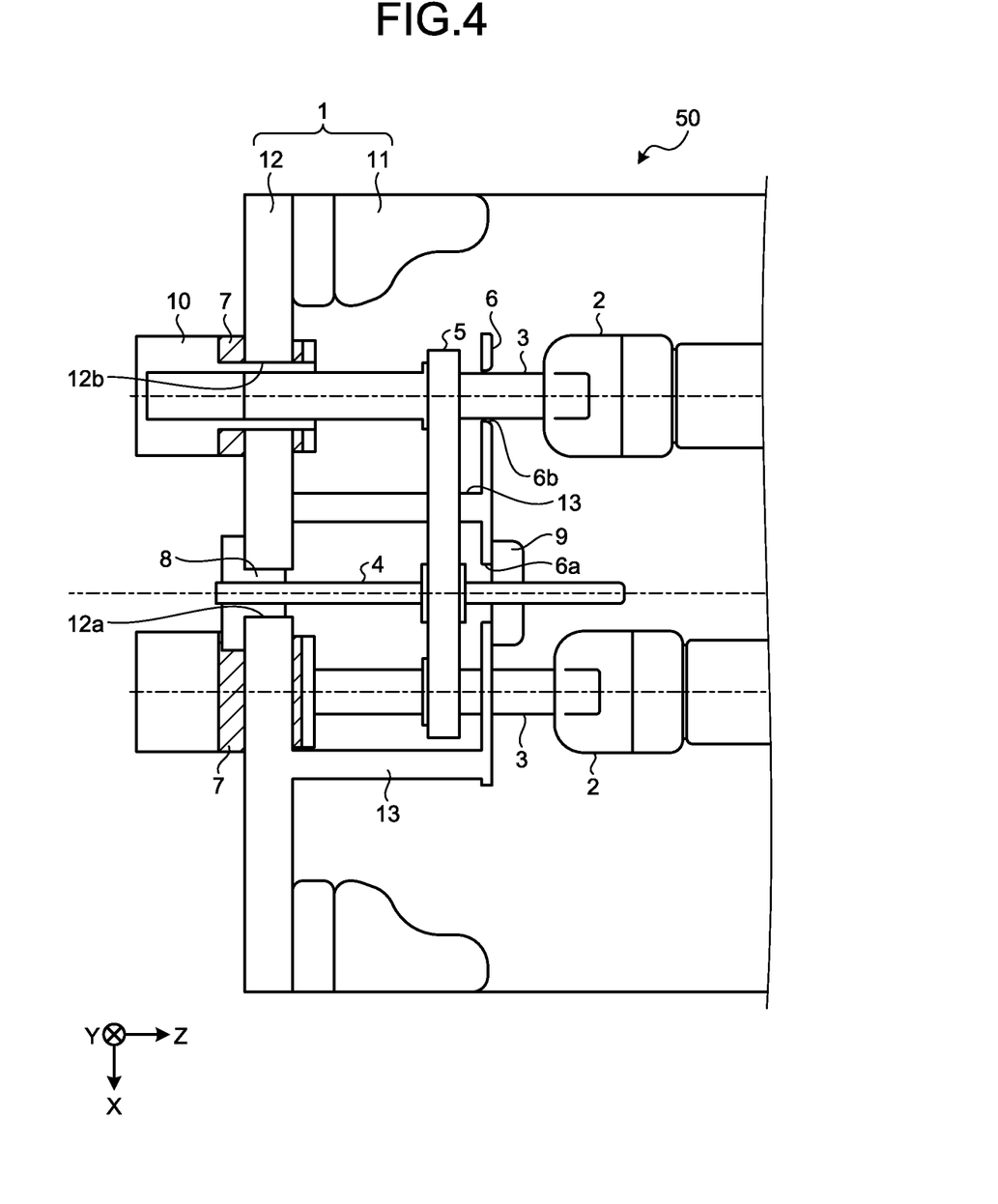
FIG. 4 is a cross-sectional view of the switchgear according to the first embodiment taken along a Y-axis, which illustrates a state in which the movable contact is in contact with the fixed contact.
Figure 5:
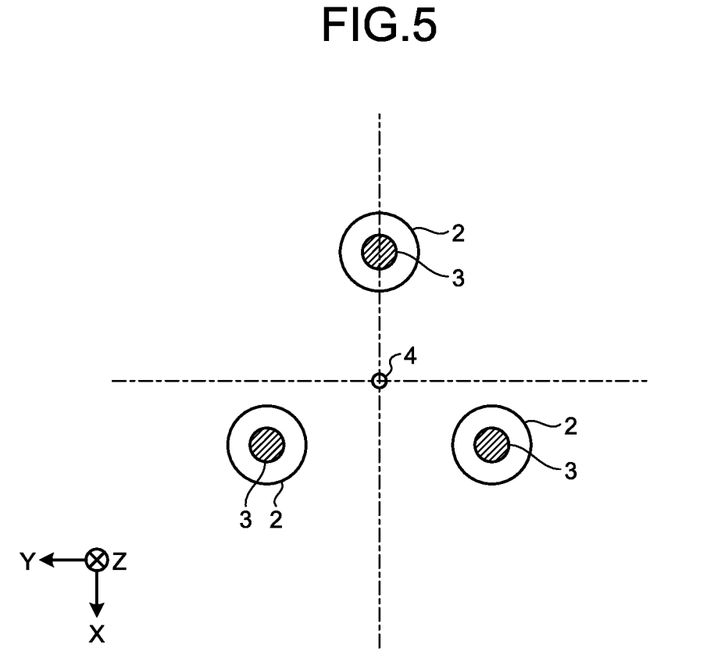
FIG. 5 is a cross-sectional view taken along a line V-V defined in FIG. 3.
Figure 6:
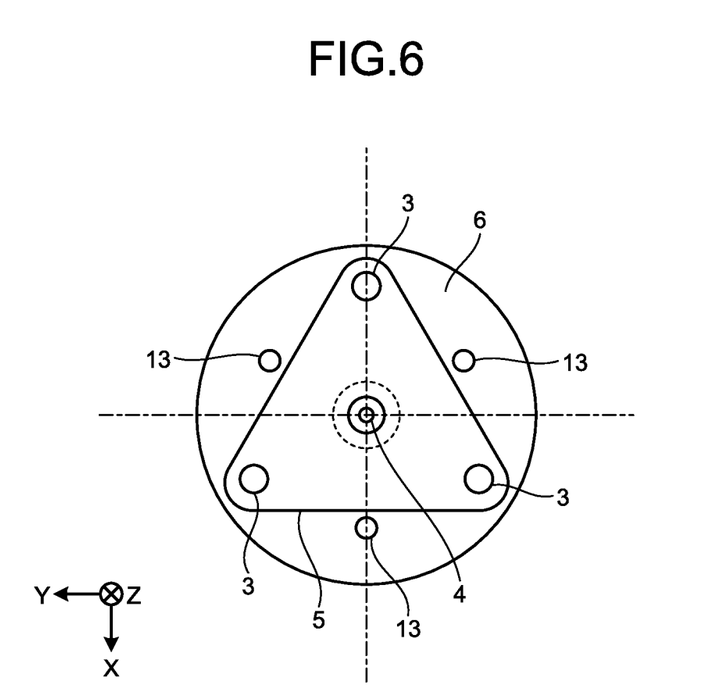
FIG. 6 is a cross-sectional view taken along a line VI-VI defined in FIG. 3.

FIG. 1 is a cross-sectional view of a switchgear according to a first embodiment of the present invention taken along an X-axis, which illustrates a state in which a movable contact is separated from a fixed contact. FIG. 2 is a cross-sectional view of the switchgear according to the first embodiment taken along a Y-axis, which illustrates a state in which the movable contact is separated from the fixed contact. FIG. 3 is a cross-sectional view of the switchgear according to the first embodiment taken along an X-axis, which illustrates a state in which the movable contact is in contact with the fixed contact. FIG. 4 is a cross-sectional view of the switchgear according to the first embodiment taken along a Y-axis, which illustrates a state in which the movable contact is in contact with the fixed contact. FIG. 5 is a cross-sectional view taken along a line V-V defined in FIG. 3. FIG. 6 is a cross-sectional view taken along a line VI-VI defined in FIG. 3. Note that the X-axis, the Y-axis, and the Z-axis orthogonal to one another are defined and illustrated in the drawings. Further, some hatching is not illustrated.

A switchgear 50 that is a grounding switch includes a tank 1 containing an insulating gas therein. An example of the insulating gas may be an SF6 gas. The tank 1 includes a cylindrical main unit 11 and a lid 12 that closes an opening of the main unit 11 at one end thereof. A lid-side rod through-hole 12a that is a first through hole is formed in the lid 12 of the tank 1. A lid-side movable contact through-hole 12b through which a movable contact 3 described later is made to penetrate is formed in the lid 12 of the tank 1.

Three fixed contacts 2 are accommodated in the tank 1. Three movable contacts 3 disposed in opposition to the three fixed contacts 2, respectively, are accommodated in the tank 1. The movable contacts 3 are configured to be reciprocatable between a position separated from the fixed contact 2 as illustrated in FIGS. 1 and 2 and a position in contact with the fixed contact 2 as illustrated in FIGS. 3 and 4. That is, the movable contacts 3 are designed to be capable of reciprocating in a direction along the Z-axis.

The movable contacts 3 penetrate through the lid-side movable contact through-holes 12b formed in the lid 12 of the tank 1. The movable contact 3 penetrates through the lid-side movable contact through-hole 12b, and is partially exposed to the outside of the tank 1. A grounding unit 10 connected to the ground are connected to the portion of the movable contact 3 exposed to the outside of the tank 1. The lid 12 is isolated from the movable contact 3 by an insulating ring 7 provided in the lid-side movable contact through-hole 12b of the lid 12.

As illustrated in FIG. 6, when viewed along the Z-axis parallel to the direction of movement of the movable contacts 3, the three fixed contacts 2 and the three movable contacts 3 are disposed in positions corresponding to the vertices of an equilateral triangle.

The switchgear 50 includes an operating rod 4 that is configured to be capable of reciprocating in a direction parallel to the direction of movement of the movable contacts 3, that is, in a direction parallel to the Z-axis. The operating rod 4 penetrates through the lid-side rod through-hole 12a formed in the lid 12 of the tank 1. The operating rod 4 penetrates through the lid-side rod through-hole 12a to be partially accommodated in the tank 1 and is partially exposed to the outside of the tank 1. A driving force from a drive mechanism (not illustrated) is applied to the portion of the operating rod 4 exposed to the outside of the tank 1. By virtue of the driving force from the drive mechanism, the operating rod 4 reciprocates in a direction parallel to the Z-axis.

The switchgear 50 includes a connecting plate 5 that couples the three movable contacts 3 and the operating rod 4 together. The connecting plate 5 moves with the three movable contacts 3 and the operating rod 4 by connecting the three movable contacts 3 and the operating rod 4. That is, when the operating rod 4 is moved by the driving force from the drive mechanism described above, the three movable contacts 3 and the connecting plate 5 also move in conjunction with each other. The connecting plate 5 is accommodated in the tank 1. The movable contact 3 penetrates through the connecting plate 5, and protrude toward the fixed contact 2 from the connecting plate 5. The operating rod 4 penetrates through the connecting plate 5, and protrudes toward the fixed contacts 2 from the connecting plate 5. The operating rod 4 is fixed to the connecting plate 5 at a position corresponding to the center of gravity of a triangle whose vertices are the connecting portions between the three movable contacts 3 and the connecting plate 5.

The switchgear 50 includes a shielding plate 6 provided closer to the fixed contacts 2 than the connecting plate 5. The shielding plate 6 prevents the occurrence of short-circuiting between the movable contacts 3 and the fixed contacts 2 while the main circuit: is energized. As illustrated in FIG. 6, the shielding plate 6 is formed larger than the connecting plate 5 when viewed along a direction parallel to the Z-axis. The shielding plate 6 is fixed to the lid 12 by fixing legs 13 extending from the lid 12. In other words, the shielding plate 6 is fixed to the lid 12 via the fixing legs 13. The fixing leg 13 may be formed integrally with the lid 12, or may be formed integrally with the shielding plate 6. Alternatively, the fixing leg 13 may be formed as a different part separately from the lid 12 and the shielding plate 6.

A shield-side rod through-hole 6a that is a second through hole through which the operating rod 4 can penetrate is formed in the shielding plate 6. A shield-side movable contact through-hole 6b that is a third through hole through which the movable contact 3 can penetrate is formed in the shielding plate 6. As illustrated in FIGS. 1 and 2, in a state where the movable contacts 3 are separated from the fixed contacts 2, the operating rod 4 penetrates through the shield-side rod through-hole 6a of the shielding plate 6 and protrudes toward the fixed contact 2 side. Further, in the state where the movable contacts 3 are separated from the fixed contacts 2, the movable contacts 3 do not penetrate through the shield-side movable contact through-holes 6b of the shielding plate 6, and do not protrude toward the fixed contact 2 side.

A first bearing 8 that supports the operating rod 4 in a state where the rode can be moved in a direction parallel to the Z-axis is provided in the lid-side rod through-hole 12a of the lid 12. The first bearing 8 also has a function as an airtight member that prevents leakage of the insulating gas from the lid-side rod through-hole 12a. Further, a second bearing 9 that supports the operating rod 4 in a state where the rod can be moved in a direction parallel to the Z-axis is provided in the shield-side rod through-hole 6a of the shielding plate 6.

In the switchgear 50 configured as described above, the operating rod 4 is moved toward the fixed contact 2 side in the state illustrated in FIGS. 1 and 2, so that the movable contacts 3 connected to the operating rod 4 by the connecting plate 5 also move toward the fixed contact 2 side. The movable contacts 3 penetrate through the shield-side movable contact through-holes 6b of the shielding plate 6, protrude toward the fixed contact 2 side from the shielding plate 6, and come into contact with the fixed contacts 2 as illustrated in FIGS. 3 and 4. As a result, the main circuit connected to the fixed contacts 2 is grounded via the movable contacts 3 and the grounding units 10. Movement of the movable contacts 3 is guided by the operating rod 4 supported by the first bearing 8 and the second bearing 9.

Figure 7:
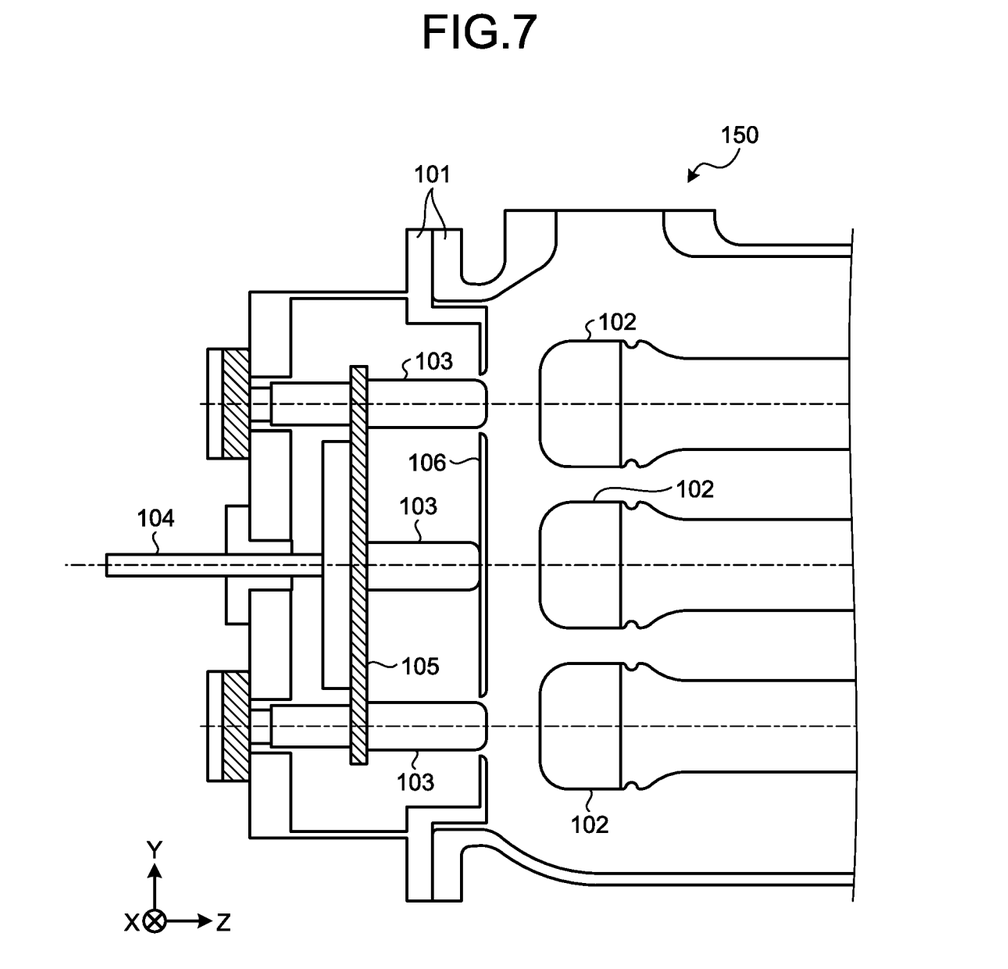
FIG. 7 is a cross-sectional view of a switchgear according to a comparative example taken along an X-axis, which illustrates a state in which a movable contact is separated from a fixed contact.
Figure 8:
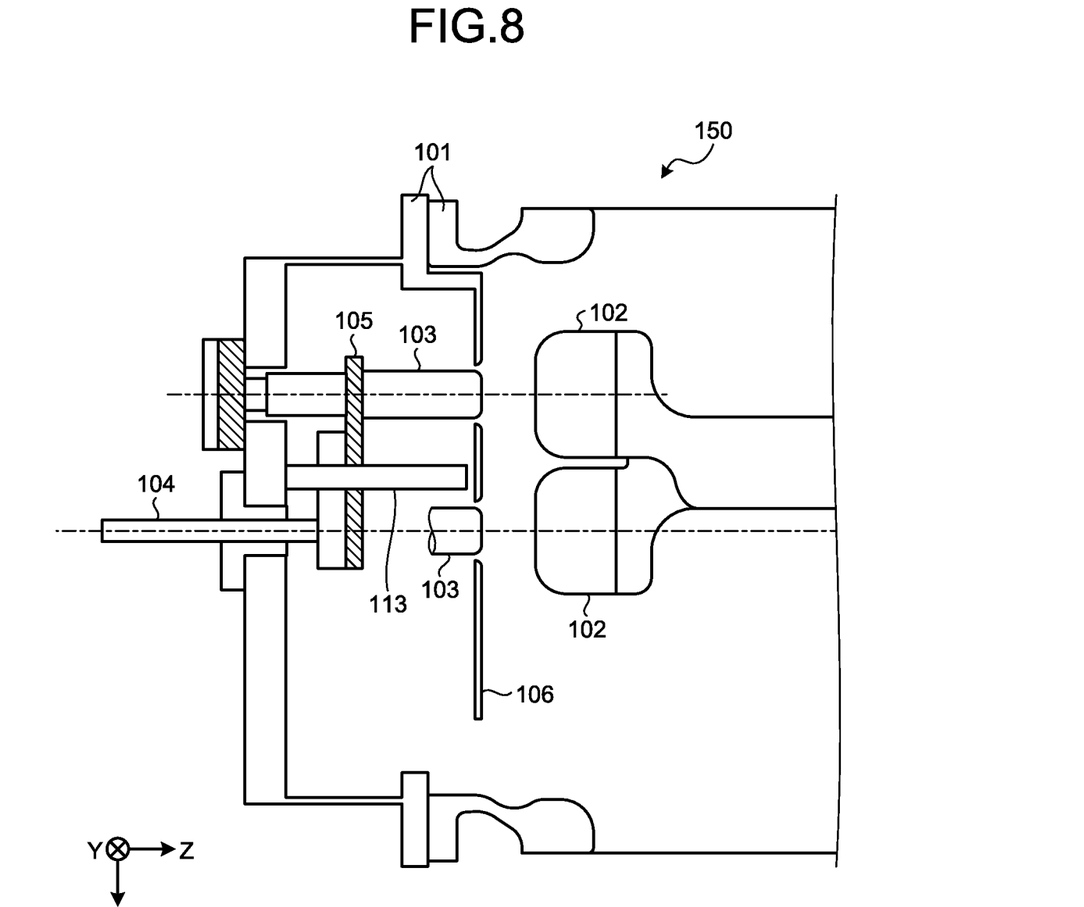
FIG. 8 is a cross-sectional view of the switchgear according to the comparative example taken along a Y-axis, which illustrates a state in which the movable contact is separated from the fixed contact.
Figure 9:
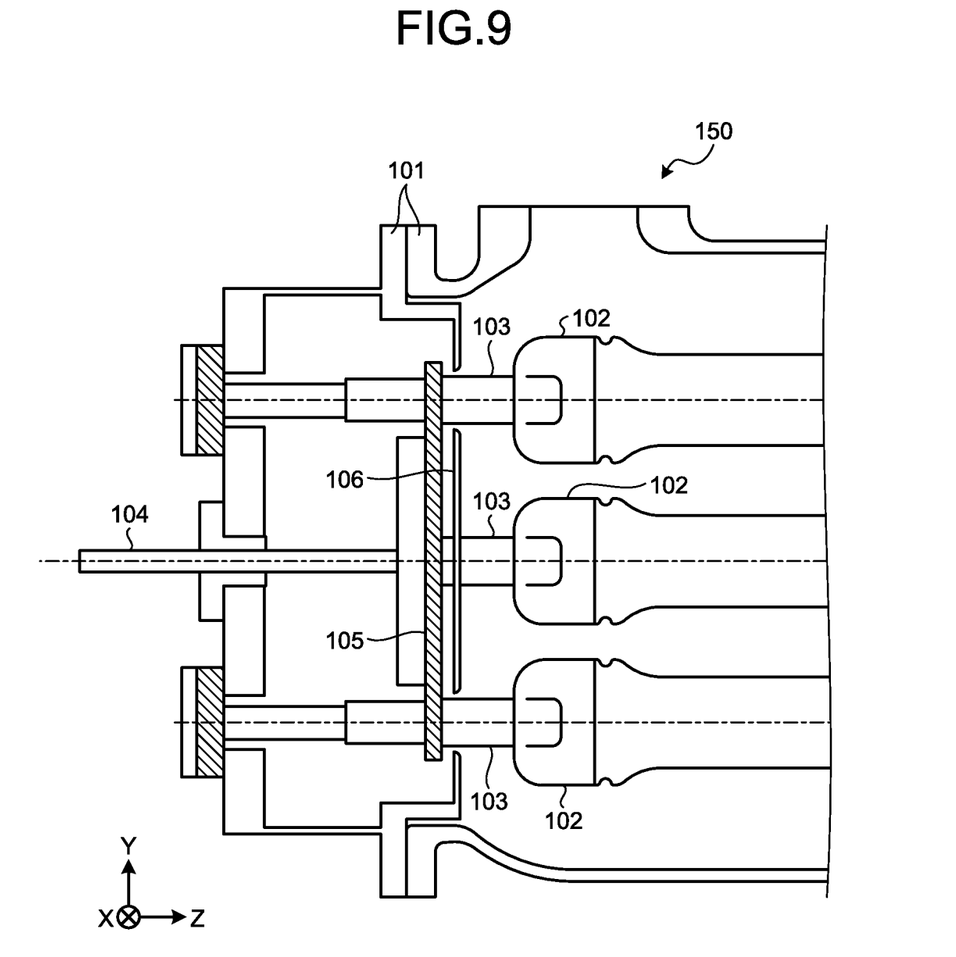
FIG. 9 is a cross-sectional view of the switchgear according to the comparative example taken along an X-axis, which illustrates a state in which the movable contact is in contact with the fixed contact.
Figure 10:
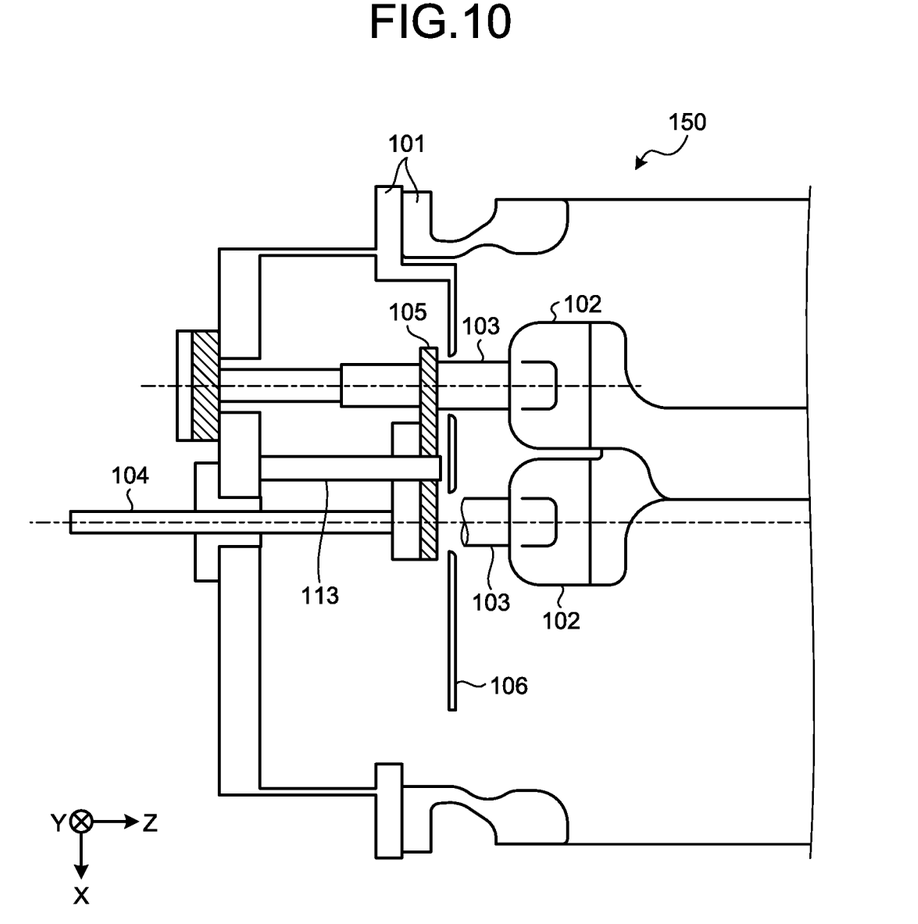
FIG. 10 is a cross-sectional view of the switchgear according to the comparative example taken along a Y-axis, which illustrates a state in which the movable contact is in contact with the fixed contact.

Next, a switchgear according to a comparative example is described. FIG. 7 is a cross-sectional view of the switchgear according to the comparative example taken along an X-axis, which illustrates a state in which movable contacts are separated from fixed contacts. FIG. 8 is a cross-sectional view of the switchgear according to the comparative example taken along a Y-axis, which illustrates a state in which the movable contacts are separated from the fixed contacts. FIG. 9 is a cross-sectional view of the switchgear according to the comparative example taken along an X-axis, which illustrates a state in which the movable contacts are in contact with the fixed contacts. FIG. 10 is a cross-sectional view of the switchgear according to the comparative example taken along a Y-axis, which illustrates a state in which the movable contacts are in contact with the fixed contacts.

In a switchgear 150 according to the comparative example, three fixed contacts 102 and three movable contacts 103 are accommodated in a tank 101, as in the first embodiment. A connecting plate 105 connected to the three movable contacts 103 and an operating rod 104 connected to the connecting plate 105 are also provided. Further, a shielding plate 106 is provided closer to the fixed contacts 102 than the connecting plate 105.

The switchgear 150 according to the comparative example includes a rod member 113 that penetrates through the connecting plate 105 separately from the operating rod 104 and has one end fixed on a wall surface of the tank 101. The rod member 113 has a cantilever structure that has one end fixed on a wall surface of the tank 101.

Movement of the connecting plate 105 and the movable contacts 103 that interlock with the operating rod 104 is guided by the rod member 113. However, since the rod member 113 has a cantilever structure, the rod member 113 might not have enough strength to prevent deformation of the movable contact 103 when an electromagnetic force is applied to the movable contact 103. Further, since the axis of the operating rod 104 to which the driving force for moving the movable contacts 103 is applied is not aligned with the rod member 113 guiding the movement of the movable contacts 103, the force applied from the operating rod 104 to the connecting plate 105 also functions as a moment to tilt the connecting plate 105 and deform the rod member 113. Therefore, the rod member 113 and the movable contacts 103 might be deformed by the force applied from the operating rod 104 to the connecting plate 105.

In the switchgear 50 according to the first embodiment, on the other hand, the operating rod 4 guides the movement of the movable contacts 3 and the connecting plate 5. Since the operating rod 4 is supported by the first bearing 8 provided in the lid 12 and the second bearing 9 provided in the shielding plate 6, the operating rod 4 achieves enough strength to prevent deformation of the movable contacts 3 more easily than the rod member 113 having a cantilever structure in the comparative example. If the thickness of the operating rod 4 and the thickness of the rod member 113 are approximately the same, the operating rod 4 supported at two points which are the first bearing 8 and the second bearing 9 has the effect to prevent deformation against greater force.

Further, since the operating rod 4 guides the movement of the movable contacts 3 and the connecting plate 5, the force applied from the operating rod 4 to the connecting plate 5 does not become a moment that deforms the movable contacts 3. For that reason, the movable contacts 3 are less likely to be deformed by the force applied from the operating rod 4 to the connecting plate 5 as in the comparative example.

Although the first embodiment refers to an example in which the three fixed contacts 2 and the three movable contacts 3 are accommodated in the tank 1, the number of the fixed contacts 2 and the number of the movable contacts 3 are not necessarily limited to three. For example, even in a case where one fixed contact 2 and one movable contact 3 are accommodated in the tank 1, it is possible to prevent deformation of the movable contact 3 using the operating rod 4 with the operating rod 4 being supported by the first bearing 8 and the second bearing 9.

The configuration described in the above embodiment is one example of the subject matter of the present invention, and may be combined with other publicly known techniques and partially omitted and/or modified without departing from the scope of the present invention.

REFERENCE SIGNS LIST 1 tank; 2 fixed contact; 3 movable contact; 4 operating rod; 5 connecting plate; 6 shielding plate; 6a shield-side rod through-hole; 6b Shield-side movable contact through-hole; 7 insulating ring; 8 first bearing; 9 second bearing; 10 grounding unit; 11 main unit; 12 lid; 12a lid-side rod through-hole; 12b lid-side movable contact through-hole; 13 fixing leg; 50 switchgear.

The invention claimed is:

1. A switchgear comprising:
a tank having a first through hole formed therein;
three fixed contacts accommodated in the tank;
three movable contacts capable of reciprocating between a position in contact with the three fixed contacts and a position separated from the three fixed contacts;
an operating rod capable of reciprocating in a direction parallel to a direction of movement of the three movable contacts, the operating rod penetrating through the first through hole;
a connecting plate connecting the three movable contacts and the operating rod, the connecting plate to be movable with the three movable contacts and the operating rod;
a shielding plate disposed closer to the three fixed contacts than the connecting plate and fixed to the tank, the shielding plate having a second through hole and three third through holes formed therein, the operating rod penetrating through the second through hole, each of the three movable contacts being capable of passing through a corresponding one of the third through holes;
a first bearing provided in the first through hole to support the operating rod; and
a second bearing provided in the second through hole to support the operating rod,
wherein:
each of the three fixed contacts and each of the three movable contacts are disposed at a vertex of a respective triangle when viewed from a direction parallel to the direction of movement of the three movable contacts, and
the operating rod is connected to the connecting plate at a position corresponding to a center of gravity of the respective triangle when viewed from a direction parallel to the direction of movement of the three movable contacts.

2. The switchgear according to claim 1, wherein the tank includes a main unit having an opening formed therein, and a lid closing the opening of the main unit, the first through hole is formed in the lid, and the shielding plate further includes a fixing leg that extends from the lid and fixes the shielding plate to the lid.

* * * * *